United States Patent
Singh et al.

(10) Patent No.: US 10,550,758 B2
(45) Date of Patent: Feb. 4, 2020

(54) COOLING SYSTEM FOR A WORK VEHICLE

(71) Applicant: CNH Industrial America LLC, New Holland, PA (US)

(72) Inventors: Samrendra Kumar Singh, Bolingbrook, IL (US); Kaushal Ghorpade, Chicago, IL (US); Hesam Abbassi, Chicago, IL (US); Panos Tamamidis, Northbrook, IL (US)

(73) Assignee: CNH Industrial America LLC, New Holland, PA (US)

( * ) Notice: Subject to any disclaimer, the term of this patent is extended or adjusted under 35 U.S.C. 154(b) by 116 days.

(21) Appl. No.: 15/845,356

(22) Filed: Dec. 18, 2017

(65) Prior Publication Data
US 2019/0186346 A1    Jun. 20, 2019

(51) Int. Cl.
*F02B 29/04* (2006.01)
*F01P 3/18* (2006.01)

(52) U.S. Cl.
CPC ............ *F02B 29/0443* (2013.01); *F01P 3/18* (2013.01); *F02B 29/0412* (2013.01); *F01P 2003/182* (2013.01); *F01P 2060/02* (2013.01); *F01P 2060/14* (2013.01)

(58) Field of Classification Search
CPC .. F01P 7/165; F01P 11/02; F01P 11/10; F01P 2003/001; F01P 2003/182; F01P 2005/105; F02B 29/0431; F02B 29/0475; E02F 9/0866
USPC .............................................. 60/599; 165/51
See application file for complete search history.

(56) References Cited

U.S. PATENT DOCUMENTS

| | | | |
|---|---|---|---|
| 3,439,657 A | 4/1969 | Gratzmuller | |
| 4,081,050 A | 3/1978 | Hennessey et al. | |
| 4,454,926 A | 6/1984 | Akins | |
| 5,201,265 A | 4/1993 | McTaggart | |
| 6,145,480 A | 11/2000 | Betz et al. | |
| 6,604,515 B2 | 8/2003 | Marsh et al. | |

(Continued)

OTHER PUBLICATIONS

Heat2power.net; "Heat to power conversion benchmark," retrieved from heep://www.heat2power.net/en_benchmark.php, Jun. 20, 2017, pp. 1-20 (20 pages).

(Continued)

*Primary Examiner* — Patrick D Maines
*Assistant Examiner* — Dapinder Singh
(74) *Attorney, Agent, or Firm* — Rickard K. DeMille; Rebecca L. Henkel

(57) ABSTRACT

A cooling system includes a charge air cooler system that includes a first stage and a second stage. The first stage receives charge air via a charge air flow path. The first stage receives coolant fluid via a first coolant fluid flow path. The second stage receives the charge air from the first stage via the charge air flow path, such the second stage of the charge air cooler system outputs the charge air and receives the coolant fluid via a second coolant fluid flow path. The cooling system includes a low temperature radiator system that includes a low-temperature radiator that directs the coolant fluid toward the second coolant fluid flow path and a third coolant fluid flow path. The cooling system includes a high temperature radiator system that directs the coolant fluid toward the first stage via the first coolant fluid flow path.

20 Claims, 4 Drawing Sheets

(56) References Cited

U.S. PATENT DOCUMENTS

| | | |
|---|---|---|
| 6,609,484 B2 | 8/2003 | Penn et al. |
| 6,880,656 B2 | 4/2005 | Pfusterschmid et al. |
| 7,051,786 B2 | 5/2006 | Vuk |
| 7,128,178 B1 | 10/2006 | Heinle et al. |
| 7,254,947 B2 | 8/2007 | Burk et al. |
| 7,325,518 B2 | 2/2008 | Bering |
| 7,814,963 B2 | 10/2010 | Adamson et al. |
| 7,896,062 B2 | 3/2011 | Adamson et al. |
| 8,132,547 B2 | 3/2012 | Guerrero et al. |
| 8,544,584 B2 | 10/2013 | Takeda et al. |
| 8,936,122 B2 | 1/2015 | MacGregor et al. |
| 9,222,447 B2 | 12/2015 | Yamada et al. |
| 9,284,880 B2 | 3/2016 | Glugla |
| 9,328,652 B2 | 5/2016 | Bruss et al. |
| 9,366,176 B2 | 6/2016 | Faulkner et al. |
| 9,416,721 B2 | 8/2016 | Sharma et al. |
| 9,528,428 B2 | 12/2016 | Appleton |
| 2002/0014212 A1* | 2/2002 | Laimbock ............... F01P 1/02 123/41.33 |
| 2011/0088668 A1* | 4/2011 | Kardos ............... F02B 29/0412 123/563 |
| 2011/0139131 A1* | 6/2011 | Kardos ............... F02B 29/0412 123/542 |
| 2011/0277973 A1 | 11/2011 | Foley |
| 2013/0333640 A1 | 12/2013 | Kardos et al. |
| 2014/0202669 A1 | 7/2014 | Kulesza et al. |
| 2016/0230641 A1 | 8/2016 | Honda |
| 2016/0356249 A1 | 12/2016 | Morey |
| 2017/0051659 A1 | 2/2017 | Banker et al. |

OTHER PUBLICATIONS

U.S. Appl. No. 15/845,532, filed Dec. 18, 2017, Samrendra Kumar Singh.

\* cited by examiner

COOLING SYSTEM FOR A WORK VEHICLE

BACKGROUND

The present disclosure relates generally to a cooling system for a work vehicle.

Certain work vehicles (e.g., tractors, harvesters, skid steers, etc.) may be used to tow or support tools to plow a field, till land, excavate soil, harvest crops, or accomplish other ground-working operations. The operations performed by the work vehicle may cause internal components of the work vehicle to generate heat. Typical work vehicles employ a cooling system to cool certain internal components. Generally, as the power of the work vehicle increases, more cooling is used, but the overall size of the work vehicle may not increase. As a result, there may not be enough room (e.g., inside the work vehicle under the hood) to accommodate typical cooling systems capable of providing suitable cooling for high-power work vehicles.

BRIEF DESCRIPTION

In one embodiment, a cooling system includes a charge air cooler system that includes a first stage that receives charge air at a first temperature via a charge air flow path, such that the first stage of the charge air cooler system receives coolant fluid via a first coolant fluid flow path. The charge air cooler system also includes a second stage that receives the charge air at a second temperature from the first stage of the charge air cooler system via the charge air flow path, such that the second stage of the charge air cooler system outputs the charge air at a third temperature and receives the coolant fluid via a second coolant fluid flow path. The second temperature is lower than the first temperature and the third temperature is lower than the second temperature. In addition, the cooling system includes a low temperature radiator system that includes a low temperature radiator that directs the coolant fluid toward the second coolant fluid flow path and a third coolant fluid flow path. The cooling system also includes a high temperature radiator system that directs the coolant fluid toward the first stage of the charge air cooler system via the first coolant fluid flow path.

In another embodiment, a cooling system is provided. The cooling system includes a high temperature radiator system that directs the coolant fluid via a first coolant fluid flow path. The cooling system also includes a water hydraulic oil cooler system that receives hydraulic oil via a hydraulic oil flow path and receives coolant fluid via a second coolant fluid flow path. In addition, the cooling system includes a low temperature radiator system that includes a low temperature radiator that directs the coolant fluid toward the second coolant fluid flow path and a third coolant fluid flow path.

In an additional embodiment, a cooling system for a work vehicle is provided. The cooling system includes a charge air cooler system that includes a first stage that receives charge air at a first temperature from a turbo of the work vehicle via a charge air flow path, such that the first stage of the charge air cooler system receives coolant fluid via a first coolant fluid flow path. The charge air cooler system also includes a second stage that receives the charge air at a second temperature from the first stage of the charge air cooler system via the charge air flow path, such that the second stage of the charge air cooler system outputs the charge air at a third temperature, such that the second stage of the charge air cooler system receives the coolant fluid via a second coolant fluid flow path. In addition, the cooling system includes a low temperature radiator system that includes a low temperature radiator that directs the coolant fluid toward the second coolant fluid flow path and a third coolant fluid flow path. Furthermore, the cooling system includes a high temperature radiator system that includes an engine radiator that directs coolant fluid to an engine of the work vehicle, a high temperature charge air cooler radiator that directs the coolant fluid toward the low temperature radiator via a fourth coolant fluid flow path, and a high temperature hydraulic oil cooler radiator that directs the coolant fluid toward the first stage of the charge air cooler system via the first coolant fluid flow path.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
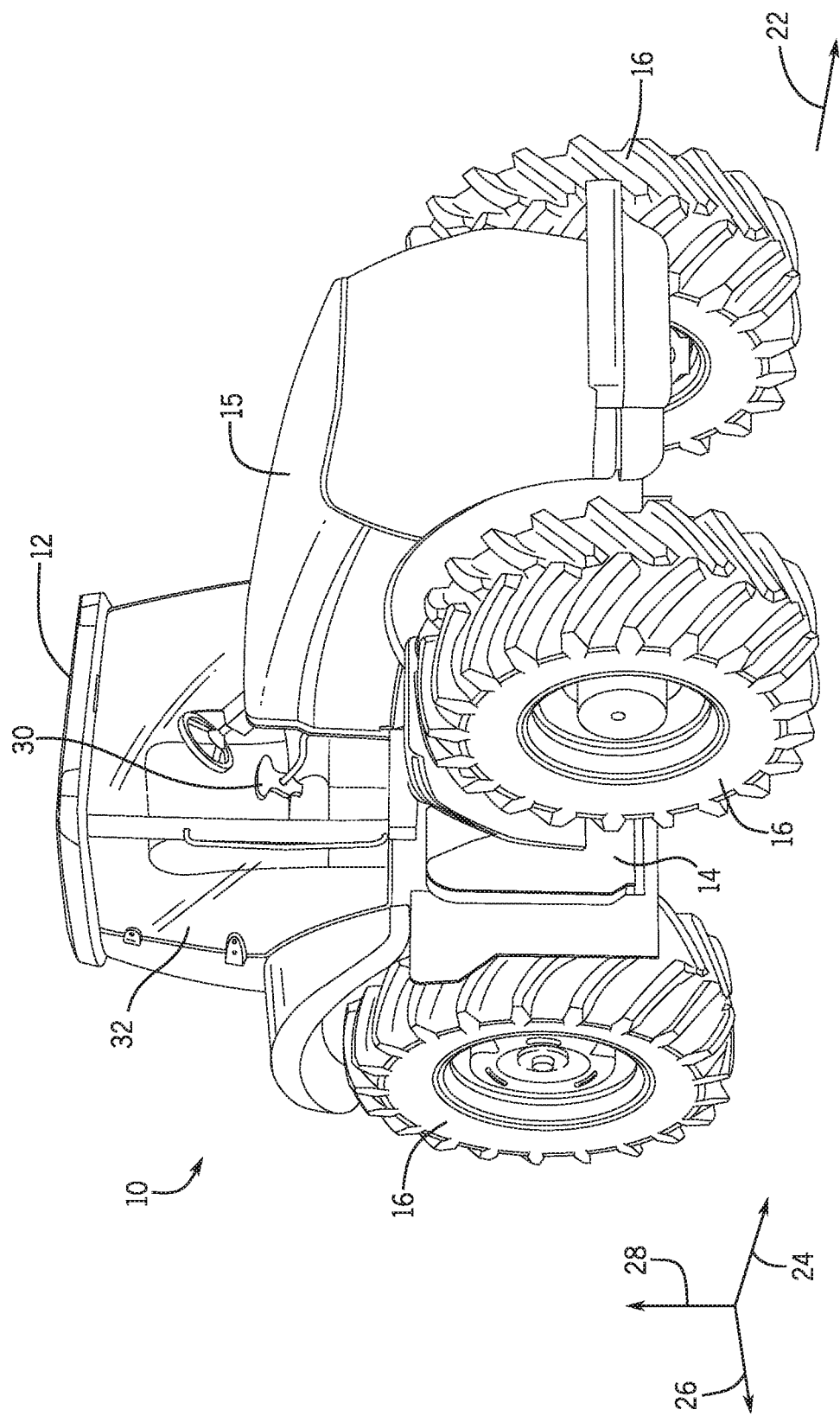
FIG. 1 is a perspective view of an embodiment of a work vehicle.

Turning to the drawings, FIG. 1 is a perspective view of an embodiment of a work vehicle 10 that may include a cooling system. In the illustrated embodiment, the work vehicle 10 is a tractor. However, it should be appreciated that the cooling system disclosed herein may be utilized on other work vehicles, such as but not limited to buses, cars, on-road trucks, skid steers, harvesters, and construction equipment. In the illustrated embodiment, the work vehicle 10 includes a cab 12 and a chassis 14. In certain embodiments, the chassis 14 may house a motor (e.g., diesel engine, etc.), a hydraulic system (e.g., including a pump, valves, reservoir, etc.), and other components (e.g., an electrical system, a suspension system, etc.) that facilitate operation of the work vehicle. In addition, the chassis 14 may support the cooling system described herein. In some embodiments, the work vehicle 10 includes a hood 15 configured to be lifted or pivotally rotated to facilitate access to the cooling system and/or other components of the work vehicle 10.

In addition, the chassis 14 supports the cab 12 and wheels 16. The wheels 16 may rotate in a circumferential direction to cause the forward linear movement of the work vehicle 10 along a direction of travel 22. In the illustrated embodiment, a coordinate system includes a longitudinal axis 24 (e.g., parallel to the direction of travel 22), a lateral axis 26, and a vertical axis 28. While the illustrated work vehicle 10 includes wheels 16, in alternative embodiments, the work vehicle may include tracks or a combination of wheels and tracks that cause the work vehicle to advance along the direction of travel 22.

The cab 12 may house an operator of the work vehicle 10. Accordingly, various controls, such as the illustrated hand controller 30, are positioned within the cab 12 to facilitate operator control of the work vehicle 10. For example, the controls may enable the operator to control rotational speed of the wheels 16, thereby facilitating adjustment of the speed and/or the direction of the work vehicle 10. In the illustrated embodiment, the cab 12 also includes a door 32 to facilitate ingress and egress of the operator from the cab 12.

Figure 2:
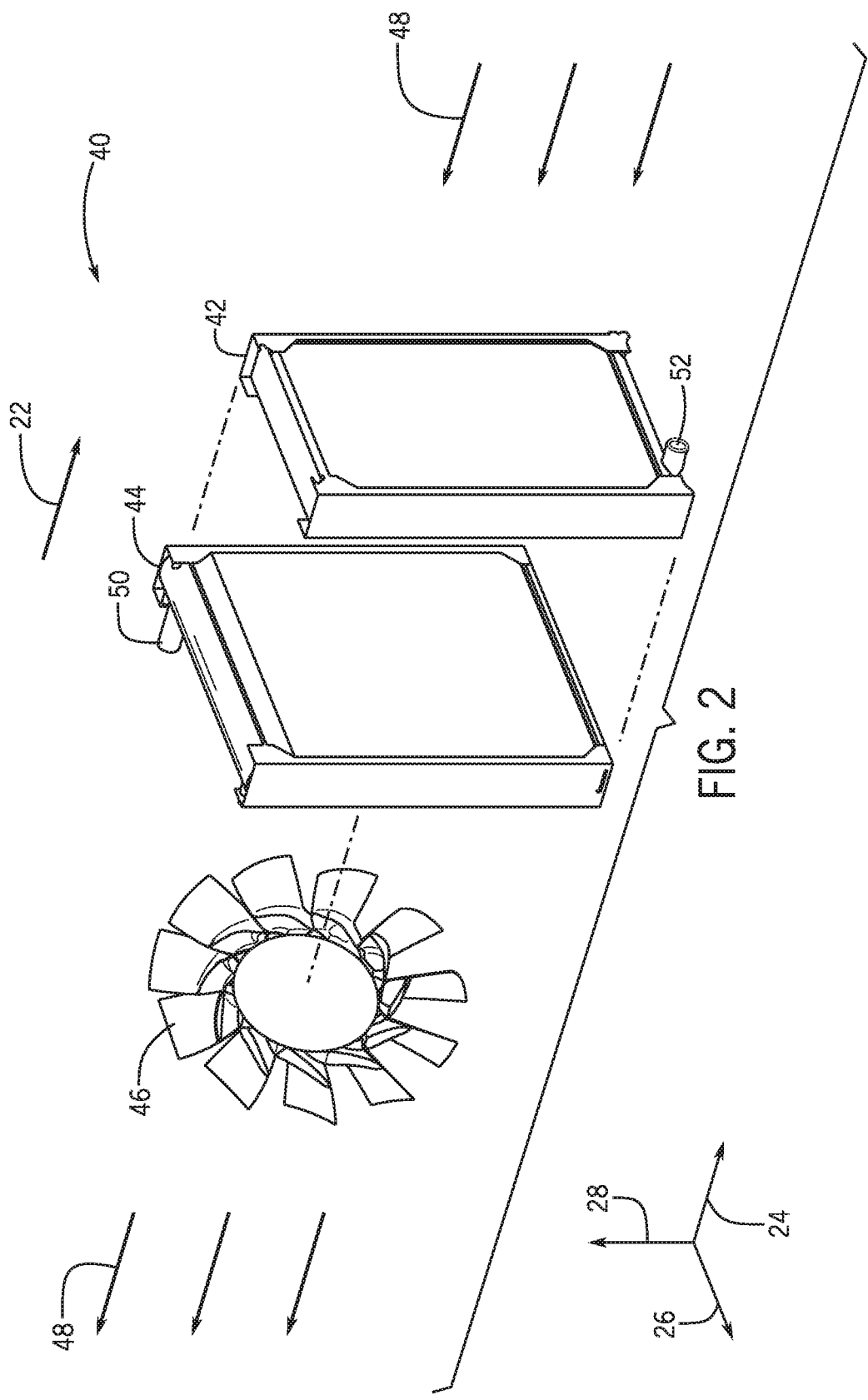
FIG. 2 is a perspective view of an embodiment of a radiator assembly of a cooling system that may be employed within the work vehicle of FIG. 1.

FIG. 2 is a perspective view of an embodiment of a radiator assembly 40 of a cooling system that may be employed within the work vehicle 10 of FIG. 1. In the illustrated embodiment, the cooling system includes two radiator systems. As illustrated, the cooling system includes a low temperature radiator system 42 and a high temperature radiator system 44. The cooling system also includes a fan 46 (e.g., a solid fan, a clutch fan, a flex fan, an electric fan, etc.) configured to drive air 48 (e.g., external airflow) through the low temperature radiator system 42 and the high temperature radiator system 44. Furthermore, the fan 46 may be configured to operate at any suitable speed (e.g., about 2180 revolutions per minute (RPM), etc.). Although in the illustrated embodiment the cooling system includes one fan 46 and two radiator systems, it should be noted that in alternative embodiments, the cooling system may include any other suitable number of fans and/or radiator systems. In some embodiments, the fan 46 may be omitted.

Furthermore, the radiator assembly 40 may have any suitable dimensions the enable cooling system to be supported by the chassis of the work vehicle. For example, the cooling system may have any suitable length (e.g., extended along the longitudinal axis 24), any suitable width (e.g., extended along the lateral axis 26), and any suitable height (e.g., extended along the vertical axis 28). In addition, the cooling system has dimensions that enable the cooling system to be housed inside the work vehicle. For example, the cooling system may be positioned at the front of the work vehicle and housed inside the hood. It should be noted that the dimensions of the cooling system may be modified to be incorporated into other vehicles of varying sizes. For example, a smaller fan (e.g., operated at a higher speed) may be substituted for the illustrated fan 46 to facilitate incorporating the cooling system into a vehicle. The cooling system described herein provides more efficient cooling to the various components of the work vehicle, as compared to previous cooling systems, thereby enabling the cooling system to effectively cool higher power engines while being able to fit inside the work vehicle (e.g., under the hood). That is, the cooling system is configured to fit inside (e.g., the space constraints under the hood of) previous/current work vehicles, while providing suitable cooling components that utilize more cooling capacity (e.g., due to higher power requirements).

In the illustrated embodiment, the low temperature radiator system 42 is positioned forward of the high temperature radiator system 44 and the fan 46 along the longitudinal axis 24. Accordingly, the high temperature radiator system 44 is positioned between the fan 46 and the low temperature radiator system 42 along the longitudinal axis 24, such that the low temperature radiator system 42 is positioned forward of the high temperature radiator system 44 relative to the direction of travel 22, and the fan is positioned reward of the high temperature radiator system 44 relative the direction of travel 22. The fan is configured to direct the flow of air 48 along the longitudinal axis 24, such that the air 48 flows through the high temperature radiator system 44 after the air 48 flows through the low temperature radiator system 42. As such, the low temperature radiator system 42 may receive the cooler air (e.g., to enable the coolant to be cooled to a lower temperature). It should be noted that in additional embodiments, the fan 46 and the two radiator systems 42, 44 may be arranged in another suitable order along the longitudinal axis 24. For example, the low temperature radiator system 42 may be positioned behind the fan 46 or the high temperature radiator system 44 relative to the direction of travel 22. In further embodiments, the low temperature radiator system 42, the high temperature radiator system 44, and the fan 46 may be oriented in another suitable direction. For example, the low temperature radiator system 42, the high temperature radiator system 44, and the fan may each be oriented substantially along the lateral axis 26, the vertical axis 28, or any other suitable direction.

The two radiator systems 42, 44 are configured to circulate coolant fluid used to cool various components of the work vehicle 10 as discussed in detail below. For example, the coolant fluid may include only water, a mixture of about 50 percent water and about 50 percent ethylene glycol, only ethylene glycol, or any other suitable coolant fluid. In some embodiments, the coolant fluid may flow into the high temperature radiator system 44 via a first opening 50. In addition, the coolant fluid may flow out of the low temperature radiator system 42 via a second opening 52. In further embodiments, the coolant fluid may enter the low temperature radiator system 42 via the second opening, and the coolant fluid may exit the high temperature radiator system 44 via the first opening 50. In some embodiments, the cooling system may include has one or more stages of water cooling. For example, he first stage of the water cooling may be performed by the coolant connected to the high temperature radiator and second or third stages of the water cooling may be performed by the coolant connected to the low temperature radiator coolant.

Figure 3:
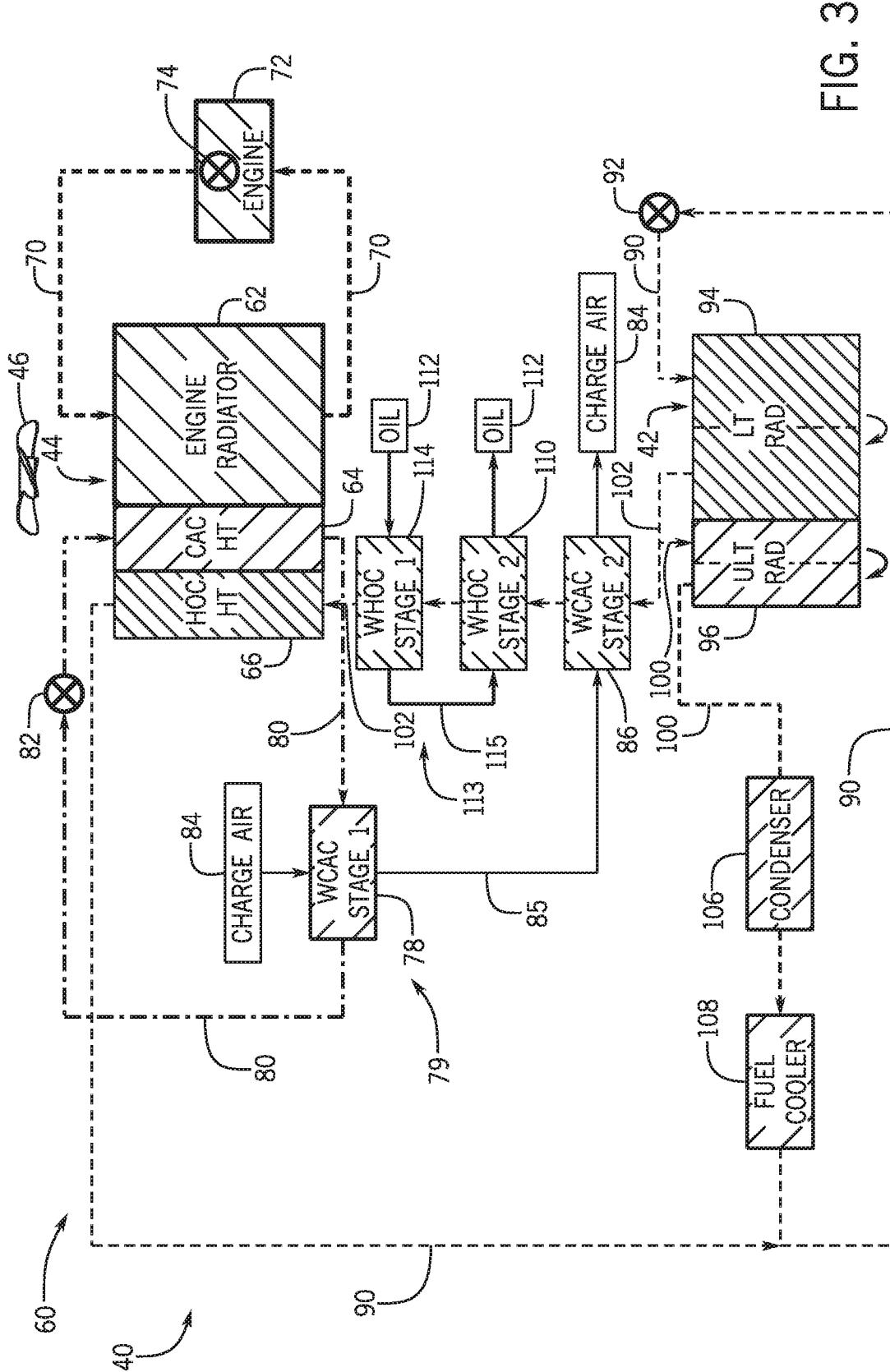
FIG. 3 is a block diagram of an embodiment of a cooling system that may be employed within the work vehicle of FIG. 1.

FIG. 3 is a block diagram of an embodiment of a cooling system 60 that may be employed within the work vehicle of FIG. 1. To facilitate discussion, the embodiments discussed herein include specific values for dimensions, heat dissipation, inlet temperature, outlet temperature, and the like, but it should be appreciated that these specific values are meant to be exemplary and in no way limiting. Furthermore, the embodiments discussed herein include a discussion of various flow path (e.g., fluid connections). The flow paths (e.g., fluid connections) may include multiple segments fluidly coupling two components of the cooling system. Furthermore, the segments are each configured to direct coolant fluid. In some embodiments, the segments are configured to direct coolant fluid with no intervening components between the illustrated components. For example, each illustrated segment of each illustrated coolant fluid flow path may include a first end and a second end configured to form a direct fluid connection (e.g., via an annular conduit) between two components. However, in alternative embodiments, intervening components may be present between the two illustrated components.

In the illustrated embodiment, the cooling system 60 includes the high temperature radiator system 44, which includes three separate heat exchangers (e.g., radiators). In the illustrated embodiment, the high temperature radiator system 44 includes an engine radiator 62, a charge air cooler high temperature radiator (CAC HT radiator) 64, and a hydraulic oil cooler high temperature radiator (HOC HT radiator) 66. However, in other embodiments, the high temperature radiator system 44 may include any suitable number of heat exchangers, such as one, two, four, six, etc.

In some embodiments, the engine radiator 62 is configured to dissipate about 149 kilowatts (kW) of heat (e.g., to the environment). However, it should be appreciated that in further embodiments, the engine radiator 62 may be configured to dissipate any suitable amount of heat (e.g., between 100 kW and 200 kW). In some embodiments, the engine radiator 62 may have dimensions (e.g., width and height) of about 532 millimeters (mm) by about 825 mm, but it should be appreciated that in further embodiments, the engine radiator 62 may be sized to have any suitable dimensions. In addition, the engine radiator 62 outputs coolant fluid at a target temperature, such as about 94 degrees Celsius (° C.), and receives coolant fluid via an engine radiator coolant fluid flow path 70 at another temperature from an associated engine 72 (e.g., about 102° C.).

In the illustrated embodiment, the engine radiator coolant fluid flow path 70 is a single closed-loop coolant fluid flow path, such that the coolant fluid output from the engine radiator 62 is provided to the engine 72, and the coolant fluid output by the engine 72 is provided to the engine radiator 62. The flow of the coolant fluid via the engine radiator coolant fluid flow path 70 may be driven by an engine pump 74 configured to drive the flow of the coolant fluid at a volumetric flow rate of about 300 liters per minute (LMP), for example. In some embodiments, while the coolant fluid is flowing through the engine radiator coolant fluid flow path 70, the temperature of the air 48 leaving the engine radiator 62 may be between 40° C. and 60° C. (e.g., 48° C.).

With regard to the discussion above of segments of the flow paths, in the illustrated embodiment, the engine radiator coolant fluid flow path 70 includes two segments. In particular, in the illustrated embodiment, a first segment is included between the outlet of the engine radiator 62 and the inlet of the engine 72, and a second segment is included between the outlet of the engine 72 and the inlet of the engine radiator 62. As mentioned above, each illustrated segment of each illustrated flow path may include a first end and a second end configured to form a direct fluid connection (e.g., via an annular conduit) between two components. However, in alternative embodiments, intervening components may be present between the two illustrated components. For example, in alternative embodiments, an intervening component may be present between the outlet of the engine 72 and the inlet of the engine radiator 62 along the second segment.

In some embodiments, the engine 72 may be any suitable engine for converting fuel into mechanical energy to drive the motion of the work vehicle 10 (e.g., and/or perform other operations). For example, the engine 72 may be an internal combustion engine, such as a spark ignition engine (e.g., gasoline engine, etc.) or a compression ignition engine (e.g., a diesel engine, a partially premixed combustion (PPC) engine, a homogeneous charge compression ignition (HCCI) engine, etc.). Furthermore, the engine pump 74 may be any suitable pump for delivering coolant fluid at a target flow rate (e.g., about 300 LPM). In some embodiments, the engine pump 74 may be electrically driven or driven directly by the engine 72. For example, the engine pump 74 may be a centrifugal pump, an axial pump, a mixed-flow pump, a positive displacement pump, and the like.

Turning to the CAC HT radiator 64, in some embodiments, the CAC HT radiator 64 is configured to dissipate about 51 kW of heat (e.g., to the environment). However, it should be appreciated that in further embodiments, the CAC HT radiator 64 may be configured to dissipate any suitable amount of heat (e.g., between 25 kW and 100 kW). In some embodiments, the CAC HT radiator 64 may have dimensions (e.g., width and height) of about 120 mm by about 825 mm, but it should be appreciated that in further embodiments, the CAC HT radiator 64 may have any suitable dimensions. Furthermore, in the illustrated embodiment, the CAC HT radiator 64 is configured to output coolant toward a first stage water charge air cooler (WCAC) 78 of a charge air cooler system 79 via a CAC HT coolant fluid flow path 80 (e.g., first coolant fluid flow path). In some embodiments, the charge air cooler system 79 may include any suitable number of stages, such as one, two, three, four, or any other suitable number of cooling stages. The coolant fluid that exits the CAC HT radiator 64 via the CAC HT coolant fluid flow path 80 is expelled at a lower temperature than the temperature of the coolant entering the CAC HT radiator 64 (e.g., because the CAC HT 64 radiator facilitates heat transfer from the coolant fluid to the environment). For example, the temperature of the coolant fluid output by the CAC HT radiator 64 may be about 108° C., and the temperature of the coolant fluid input to the CAC HT radiator 64 may be about 113° C.

In the illustrated embodiment, the CAC HT coolant fluid flow path 80 is a single closed-loop flow path, such that the coolant fluid output from the CAC HT radiator 64 flows to the first stage WCAC 78, and the coolant fluid output from the first stage WCAC 78 flows to the CAC HT radiator 64. The flow of the coolant fluid via the CAC HT coolant fluid flow path 80 may be driven by a CAC pump 82 configured to drive the flow of the coolant fluid in the CAC HT coolant fluid flow path 80 at a volumetric flow rate of about 160 LPM. In some embodiments, while the coolant fluid is flowing to the first stage WCAC 78, the temperature of the charge air 84 output from the first stage WCAC 78 may be about 108° C.

In certain embodiments, the charge air 84 entering the first stage WCAC 78 via a charge air flow path 85 may have a mass flow rate of about 1415 kilograms per hour (kg/h) and a temperature of about 234° C. However, it should he understood that the temperature and mass flow rate of the charge air 84 depends on the type of turbocharger, the type of engine associated with the work vehicle engine load, and boost pressure, among other factors. In some embodiments, the first stage WCAC 78 may dissipate about 51 kW of heat. For example, the fluid coolant flowing through the first stage WCAC 78 may facilitate the heat dissipation of about 51 kW, however it should be understood that the first stage WCAC 78 may dissipate any suitable amount of heat (e.g., between 25 kW and 100 kW). In some embodiments, after the first stage WCAC 78 dissipates about 51 kW of heat, the charge air 84 may exit the first stage WCAC 78 via the charge air flow path 85 at a lower temperature than when it entered the first stage WCAC 78. For example, the charge air 84 may be output from the first stage WCAC at about 108° C.

In the illustrated embodiment, the charge air 84 then flows from the first stage WCAC 78 into a second stage WCAC 86 of the charge air cooler system 79 via the charge air flow path 85 for additional cooling. The second stage WCAC 86 may dissipate about 17 kW of heat, as described in detail below, such that the charge air 84 output by the second stage WCAC 86 is about 70° C. In the illustrated embodiment, the charge air 84 expelled from the second stage WCAC 86 has a temperature of about 67° C., but it should be appreciated that in additional embodiments, the charge air may be expelled from the second stage WCAC 86 at any suitable temperature below about 70° C., for example, such as 69.5° C., 68° C., 65° C., and the like.

Turning to the HOC HT radiator 66, in some embodiments, the HOC HT radiator 66 is configured to dissipate about 20 kW of heat (e.g., to the environment). However, it should be appreciated that in further embodiments, the HOC HT radiator 66 may be configured to dissipate any suitable amount of heat (e.g., between 15 kW and 40 kW). In some embodiments, the HOC HT radiator 66 may have dimensions (e.g., width and height) of about 81 mm by about 825 mm, but it should be appreciated that in further embodiments, the HOC HT radiator 66 have any suitable dimensions. Furthermore, in some embodiments, the HOC HT radiator 66 is configured to output coolant fluid toward the low temperature radiator system 42 via the HOC HT coolant fluid flow path 90. In some embodiments, the coolant fluid output by the HOC HT radiator 66 has a lower temperature than the coolant fluid input into the HOC HT radiator 66. For example, the coolant fluid expelled by the HOC HT 66 radiator may be at a temperature of about 72° C., while the coolant fluid entering the HOC HI radiator 66 may be at a temperature of about 74° C., but it should be appreciated that in alternative embodiments the temperatures at the inlet and outlet of the HOC HT radiator 66 may be any suitable temperatures. In the illustrated embodiment, the flow of the coolant fluid via a HOC HT coolant fluid flow path 90 (e.g., the fourth coolant fluid flow path) is driven by the HOC pump 92, which may include any suitable pump configured to drive the flow of the coolant fluid into the low temperature radiator system 42 at a target volumetric flow rate. In particular, the HOC pump 92 may pump the coolant fluid into the low temperature radiator system 42 at a volumetric flow rate of about 160 LMP and at a temperature of about 71° C.

In the illustrated embodiment, the low temperature radiator system 42 includes a low temperature (LT) radiator 94 and an ultra-low temperature (ULT) radiator 96. As mentioned above, in some embodiments, the coolant fluid may be pumped into the low temperature radiator 94 (e.g., via the HOC HT coolant fluid flow path 90) by the HOC pump 92 at a volumetric flow of about 160 LPM. The coolant fluid may then flow from the low temperature radiator 94 to into the ultra-low temperature radiator 96.

In some embodiments, the low temperature radiator 94 is configured to dissipate about 47 kW of heat (e.g., to the environment). However, it should be appreciated that in further embodiments, the low temperature radiator 94 may be configured to dissipate any suitable amount of heat (e.g., between 30 kW and 60 kW). In some embodiments, the low temperature radiator 94 may have dimensions (e.g., width and height) of about 406 mm by about 800 mm, but it should be appreciated that in further embodiments, the low temperature radiator 94 have any suitable dimensions. In addition, the low temperature radiator 94 outputs coolant fluid at a target temperature, such as about 67° C.

In the illustrated embodiment, the coolant fluid output by the low temperature radiator 94 is split into two coolant fluid flow paths. As illustrated, the coolant fluid output by the low temperature radiator 94 may flow into a first low temperature radiator coolant fluid flow path 100 (e.g., third coolant fluid flow path) and a second low temperature radiator coolant fluid flow path 102 (e.g., fourth coolant fluid flow path). The first low temperature radiator coolant fluid flow path 100 may direct the coolant fluid into the ultra-low temperature radiator 96. The second low temperature radiator coolant fluid flow path 102 may direct the flow of the coolant fluid into the second stage WCAC 86. Accordingly, in the illustrated embodiment, the fluid directed into the low temperature radiator 94 at about 160 LPM, for example, is output to the first low temperature radiator path 100 and to the second low temperature radiator coolant fluid flow path 102. The coolant fluid may flow along the first low temperature radiator coolant fluid flow path 100 and the second low temperature radiator coolant fluid flow path 102 at any suitable respective volumetric flow rates. For example, the first low temperature radiator coolant fluid flow path 100 may receive coolant fluid at about 145 LPM, and second low temperature radiator coolant fluid flow path 102 may receive coolant fluid at about 15 LPM.

With regard to the coolant fluid directed to the first low temperature radiator coolant fluid flow path 100, the coolant fluid is directed to the ultra-low temperature radiator 96 (e.g., at about 15 LPM). In some embodiments, the ultra-low temperature radiator 96 is configured to dissipate about 7 kW of heat (e.g., to the environment). However, it should be appreciated that in further embodiments, the ultra-low temperature radiator 96 may be configured to dissipate any suitable amount of heat (e.g., between 2 kW and 20 kW). In some embodiments, the ultra-low temperature radiator 96 has dimensions (e.g., width and height) of about 101 mm by about 800 mm, but it should be appreciated that in further embodiments, the ultra-low temperature radiator 96 may have any suitable dimensions. In addition, in the illustrated embodiment, the ultra-low temperature radiator 96 outputs coolant fluid at a target temperature, such as about 59° C.

In some embodiments, the coolant fluid output by the ultra-low temperature radiator 96 may be directed via the first low temperature radiator coolant fluid flow path 100 toward other components associated with the work vehicle 10. For example, in the illustrated embodiment, the coolant fluid output by the ultra-low temperature radiator 96 is directed toward a condenser 106 and then toward a fuel cooler 108 before flowing into the HOC HT coolant fluid flow path 90 (e.g., to be directed into the low temperature radiator 94 by the HOC pump 92). In the illustrated embodiment, the condenser 106 and the fuel cooler 108 dissipate about 9 kW and about 2 kW of heat, respectively. The condenser may be any suitable device used to condense a substance from a gaseous state to a liquid state (e.g., by cooling it), and the fuel cooler may be any suitable device used to decrease the temperature of fuel flowing inside the work vehicle 10 (e.g., to the engine 72). Furthermore, in some embodiments, the condenser 106 and the fuel cooler 108 may be part of the heating, ventilation, and air conditioning (HVAC) system of the work vehicle. In other embodiments, the condenser 106 and the fuel cooler 108 may be replaced with any other suitable devices, such as an expansion valve, a compressor pump, any devices associated with the air conditioning system of the work vehicle 10, etc. Furthermore, in certain embodiments, the condenser 106 or the fuel cooler 108 may be omitted and/or another component may be fluidly coupled to the first low temperature radiator coolant fluid flow path to receive the coolant fluid.

With regard to the coolant fluid directed to the second low temperature radiator coolant fluid flow path 102, the coolant fluid is output by the low temperature radiator 94 at a target temperature (e.g., about 67° C.), such that the coolant fluid is directed toward the second stage WCAC 86 (e.g., at about 145 LPM). As mentioned above, the second stage WCAC 86 may dissipate about 17 kW of heat thereby expelling the charge air 84 (e.g., to the engine 72) at a target temperature (e.g., below about 70° C.). However, the second stage WCAC 86 may dissipate any other suitable amount of heat (e.g., between 10 kW and 25 kW) based on the properties of the second stage WCAC 86 (e.g., the number of fins, the size of the fins, the number of coolant fluid passes, the material, etc.). The second stage WCAC 86 may output the coolant fluid toward a second stage water hydraulic oil cooler (WHOC) 110.

In the illustrated embodiment, hydraulic oil 112 (e.g., hydraulic fluid) is directed into a first stage WHOC 114 of a WHOC system 113 via a hydraulic oil flow path 115. The hydraulic oil 112 is then directed from the first stage WHOC 114 into the second stage WHOC 110 of the WHOC system 113 in the hydraulic oil flow path 115. Indeed, the hydraulic oil 112 is directed through two stages of the WHOC system 113 via the hydraulic oil flow path 115, whereby the hydraulic oil 112 is cooled by each stage WHOC. For example, the first stage WHOC 114 and the second stage WHOC 110 may be configured to dissipate about 31 kW and about 17 kW of heat, respectively, to facilitate cooling the hydraulic oil 112. However, it should be appreciated that the cooling system 60 may include any suitable number of stages associated with the WHOC (e.g., one stage, two stages, three stages, four stages, etc.) to cool the hydraulic oil 112 (e.g., with the coolant fluid received from the low temperature radiator 94 via the second low temperature radiator coolant fluid flow path 102). The hydraulic oil 112 may enter the first stage WHOC 114 at a volumetric flow rate of about 92 LPM and a temperature of about 87° C., but it should be appreciated that the hydraulic oil 112 may enter the first stage WHOC at any other suitable volumetric flow rate and temperature. In addition, the second stage WHOC 110 receives the hydraulic oil 112 before outputting the hydraulic oil 112 (e.g., toward the hydraulic system of the work vehicle 10). In some embodiments, the second stage WHOC 110 may output the hydraulic oil 112 at a temperature lower than the temperature at which the hydraulic oil 112 enters the first stage WHOC 114. For example, the first stage WHOC 114 may receive the hydraulic oil 112 at a temperature of about 87° C., and the second stage WHOC 110 may output the hydraulic oil 112 at a temperature of about 73° C.

In some embodiments, the first stage WHOC 114 may direct the coolant fluid via the second low temperature radiator coolant fluid flow path 102 toward the HOC HT radiator 66. The temperature of the coolant fluid output by the first stage WHOC 114 to the HOC HT radiator 66 may be at a higher temperature (e.g., 74° C.) than the temperature of the coolant fluid received by the second stage WCAC 86 (e.g., 67° C.). As such, in some embodiments, the coolant fluid flowing via the second low temperature radiator coolant fluid flow path 102 is directed toward the HOC HT coolant fluid flow path 90, such that the HOC HT radiator 66 cools the coolant fluid. Furthermore, coolant fluid may flow from the HOC HT radiator 66 toward the low temperature radiator system 42 via the HOC HT coolant fluid flow path 90, which also receives coolant fluid flowing from the condenser 106 and fuel cooler 108.

Accordingly, the cooling system 60 includes a high temperature radiator system 44 that is configured to output coolant to the engine 72, the first stage WCAC 78, and the low temperature radiator system 42 via three different heat exchangers (e.g., the engine radiator 62, the CAC HT radiator 64, and the HOC HT radiator 66) of the high temperature radiator system 44. As such, in some embodiments, the high temperature radiator system 44 may cool (e.g., with output coolant fluid) the engine 72, the charge air 84, and the coolant fluid provided to the low temperature radiator system 42. It should be appreciated that the high temperature radiator system 44 may include any other suitable number of heat exchangers (e.g., one, two, four, etc.). In addition, the cooling system 60 includes a low temperature radiator system 42 that is configured to output coolant fluid toward the second stage WCAC 86, and the first and second stage WHOC. Furthermore, the low temperature radiator system 42 is configured to output coolant fluid toward the condenser 106 and the fuel cooler 108 (e.g., via the first low temperature coolant fluid flow path 100). As such, in some embodiments, the low temperature radiator system 42 may cool (e.g., with output coolant fluid) the condenser 106 and the fuel cooler 108 via the first low temperature radiator coolant fluid flow path 100. In addition, the low temperature radiator system 42 may cool the charge air 84 and the hydraulic oil 112 via the second low temperature radiator coolant fluid flow path 102.

Figure 4:
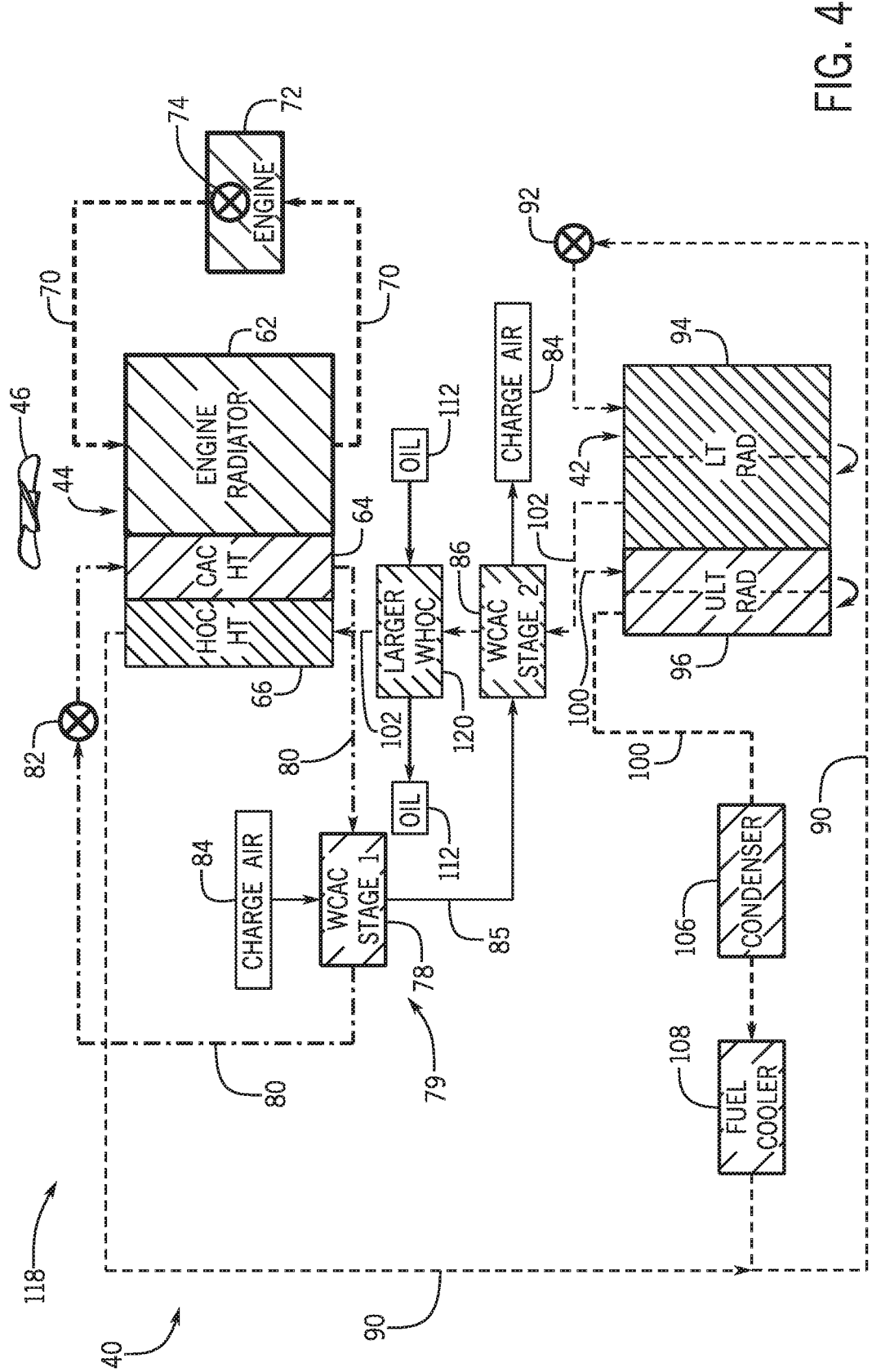
FIG. 4 is a block diagram of another embodiment of a cooling system that may be employed within the work vehicle of FIG. 1.

FIG. 4 is a block diagram of another embodiment of a cooling system 118 that may employed within the work vehicle of FIG. 1. As illustrated, the second cooling system 118 has a similar configuration to that of the cooling system 60 disclosed above with reference to FIG. 3. Indeed, the second cooling system 118 includes the high temperature radiator system 44, the low temperature radiator system 42, and the water charge air cooler system 79. In the illustrated embodiment, the cooling system 118 includes a one-stage WHOC 120 (e.g., as compared to the two-stage WHOC disclosed above with reference to FIG. 3).

In some embodiments, the one-stage WHOC 120 may be configured to dissipate about 47 kW of heat. As such, the one-stage WHOC 120 may receive hydraulic oil 112 via the hydraulic oil flow path 115 and output the hydraulic oil 112 at a lower temperature (e.g., toward the hydraulic system associated with the work vehicle 10). For example, the one-stage WHOC 120 may receive hydraulic oil 112 via the hydraulic oil flow path 115 at an inlet temperature of about 87° C. and at a volumetric flow rate of about 92 LPM, and the WHOC 120 may output the hydraulic oil 112 at an outlet temperature of about 73° C. and at a volumetric flow rate of about 92 LPM.

However, it should be appreciated that the second cooling system 118 may include a WHOC with any suitable number of stages (e.g., one stage, two stages, three stages, four stages, etc.) to cool the hydraulic oil 112 (e.g., with the coolant fluid received from the low temperature radiator 94 via the second low temperature radiator coolant fluid flow path 102). In further embodiments, the hydraulic oil 112 may enter the WHOC at any suitable volumetric flow rate and temperature. In addition, the one-stage WHOC 120 may receive the hydraulic oil 112 before outputting the hydraulic oil 112 (e.g., toward the hydraulic system of the work vehicle 10).

In some embodiments, the one-stage WHOC 120 may direct the coolant fluid via the second low temperature radiator coolant fluid flow path 102 toward the HOC HT radiator 66. The temperature of the coolant fluid output by the one-stage WHOC 120 may he at a higher temperature (e.g., about 74° C.) than the temperature of the coolant fluid received by the second stage WCAC 86 (e.g., 67° C.). In some embodiments, the coolant fluid flowing via the second low temperature radiator coolant fluid flow path 102 is directed toward the HOC HT coolant fluid flow path 90.

While only certain features have been illustrated and described herein, many modifications and changes will occur to those skilled in the art. It is, therefore, to be understood that the appended claims are intended to cover all such modifications and changes as fall within the true spirit of the disclosure.

The invention claimed is:
1. A cooling system, comprising:
   a charge air cooler system, comprising:
      a first stage configured to receive charge air at a first temperature via a charge air flow path, wherein the first stage of the charge air cooler system is configured to receive coolant fluid via a first coolant fluid flow path;

a second stage configured to receive the charge air at a second temperature from the first stage of the charge air cooler system via the charge air flow path, wherein the second stage of the charge air cooler system is configured to output the charge air at a third temperature, wherein the second stage of the charge air cooler system is configured to receive the coolant fluid via a second coolant fluid flow path, wherein the second temperature is lower than the first temperature and the third temperature is lower than the second temperature;

a low temperature radiator system, comprising:
a low temperature radiator configured to direct the coolant fluid toward the second coolant fluid flow path;

a high temperature radiator system configured to direct the coolant fluid toward the first stage of the charge air cooler system via the first coolant fluid flow path; and a water hydraulic oil cooler system configured to receive the coolant fluid from the second stage of the charge air cooler system and to direct the coolant fluid toward the high temperature radiator system.

2. The cooling system of claim 1, comprising a fan, wherein the fan is position rearward the high temperature radiator system relative to a longitudinal axis of a vehicle.

3. The cooling system of claim 2, wherein the high temperature radiator system is positioned rearward the low temperature radiator system relative to the longitudinal axis, wherein the high temperature radiator system is positioned between the fan and the low temperature radiator system.

4. The cooling system of claim 1, wherein the low temperature radiator system comprises an ultra-low temperature radiator configured to receive the coolant fluid via a third coolant fluid flow path.

5. The cooling system of claim 4, wherein the ultra-low temperature radiator is configured direct the coolant fluid toward a condenser of a work vehicle via the third coolant fluid flow path.

6. The system of claim 5, wherein the ultra-low temperature radiator is configured to direct the coolant fluid toward a fuel cooler of the work vehicle via the third coolant fluid flow path, wherein the fuel cooler and the condenser are arranged in series with respect to one another.

7. The cooling system of claim 1, wherein the high temperature radiator system comprises:
an engine radiator configured to direct coolant fluid to an engine of a work vehicle;
a high temperature charge air cooler radiator configured to direct the coolant fluid toward the low temperature radiator via a fourth coolant fluid flow path; and
a high temperature hydraulic oil cooler radiator configured to direct the coolant fluid toward the first stage of the charge air cooler system via the first coolant fluid flow path.

8. The cooling system of claim 1, wherein the water hydraulic oil cooler system comprises a first stage and a second stage of the water hydraulic oil cooler system, wherein the first stage of the water hydraulic oil cooler system is configured to receive hydraulic oil via a hydraulic oil flow path and to direct the hydraulic oil toward the second stage of the water hydraulic oil cooler system via the hydraulic oil flow path, and the second stage of the water hydraulic oil cooler system is configured to receive the hydraulic oil via the hydraulic oil flow path.

9. The cooling system of claim 8, wherein the second stage of the water hydraulic oil cooler system is configured to receive the coolant fluid from the second stage of the charge air cooler system and to direct the coolant fluid toward the first stage of the water hydraulic oil cooler system, and the first stage of the water hydraulic oil cooler system is configured to direct the coolant fluid toward the high temperature radiator system.

10. The cooling system of claim 1, wherein the second stage of the charge air cooler system is configured to output the charge air towards an environment.

11. The cooling system of claim 1, wherein the third temperature is below 70° C.

12. A cooling system, comprising:
a high temperature radiator system configured to direct coolant fluid via a first coolant fluid flow path;
a water hydraulic oil cooler system configured to receive hydraulic oil via a hydraulic oil flow path and to direct the coolant fluid, via a second coolant fluid flow path, toward the high temperature radiator system; and
a low temperature radiator system, comprising a low temperature radiator configured to direct the coolant fluid toward the second coolant fluid flow path.

13. The cooling system of claim 12, wherein the water hydraulic oil cooler system comprises a first stage and a second stage, wherein the first stage of the water hydraulic oil cooler system is configured to receive the hydraulic oil via the hydraulic oil flow path and to direct the hydraulic oil toward the second stage of the water hydraulic oil cooler system via the hydraulic oil flow path, wherein the second stage of the water hydraulic oil cooler system is configured to receive the hydraulic oil via the hydraulic oil flow path, and the second stage of the water hydraulic oil cooler system is configured to receive coolant fluid from the low temperature radiator system via the second coolant fluid flow path.

14. The cooling system of claim 13, wherein the second stage of the water hydraulic oil cooler system is configured to:
receive coolant fluid from the low temperature radiator system via the second coolant fluid flow path;
raise a temperature of the coolant fluid; and
direct the coolant fluid toward the first stage of the water hydraulic oil cooler system via the second coolant fluid flow path.

15. The cooling system of claim 13, wherein the first stage of the water hydraulic oil cooler system is configured to:
receive the coolant fluid from the second stage of the water hydraulic oil cooler system via the second coolant fluid flow path; and
direct the coolant fluid toward the high temperature radiator system via the second coolant fluid flow path.

16. The cooling system of claim 12, wherein the low temperature radiator system comprises an ultra-low temperature radiator configured to direct the coolant fluid toward a condenser and a fuel cooler of the work vehicle via a third coolant fluid flow path, and wherein the condenser and the fuel cooler are arranged in series with respect to one another along the third coolant fluid flow path.

17. A cooling system for a work vehicle, comprising:
a charge air cooler system, comprising:
a first stage configured to receive charge air at a first temperature from a turbo of the work vehicle via a charge air flow path, wherein the first stage of the charge air cooler system is configured to receive coolant fluid via a first coolant fluid flow path;
a second stage configured to receive the charge air at a second temperature from the first stage of the charge air cooler system via the charge air flow path, wherein the second stage of the charge air cooler system is configured to output the charge air at a third temperature, wherein the second stage of the charge air cooler system is configured to receive the coolant fluid via a second coolant fluid flow path;

a low temperature radiator system, comprising:
- a low temperature radiator configured to direct the coolant fluid toward the second coolant fluid flow path and a third coolant fluid flow path; and
- an ultra-low temperature radiator configured to receive the coolant fluid from the third coolant fluid flow path and to direct the coolant fluid toward a condenser and a fuel cooler of the work vehicle via the third coolant fluid flow path, wherein the condenser and the fuel cooler are arranged in series with respect to one another along the third coolant fluid flow path; and a high temperature radiator system, comprising:
- an engine radiator configured to direct coolant fluid to an engine of the work vehicle;
- a high temperature charge air cooler radiator configured to direct the coolant fluid toward the low temperature radiator via a fourth coolant fluid flow path;
- a high temperature hydraulic oil cooler radiator configured to direct the coolant fluid toward the first stage of the charge air cooler system via the first coolant fluid flow path.

18. The cooling system of claim 17, wherein the first stage of the charge air cooler system is configured to receive the charge air from a turbo of the work vehicle.

19. The cooling system of claim 17, wherein the coolant fluid received by the condenser is directed toward the fuel cooler along the third coolant fluid flow path.

20. The cooling system of claim 17, wherein the second stage of the charge air cooler system is configured to output the charge air at a third temperature toward an external environment.

* * * * *